(12) United States Patent
Sloane et al.

(10) Patent No.: US 12,301,630 B2
(45) Date of Patent: May 13, 2025

(54) SYSTEM FOR SECURING ELECTRONIC DEVICES AND ELECTRONIC DATA USING AUTOMATED DYNAMIC CONTROL MODIFICATIONS

(71) Applicant: BANK OF AMERICA CORPORATION, Charlotte, NC (US)

(72) Inventors: Brandon Sloane, Indian Land, SC (US); Wendell Allen Jenkins, Clover, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 254 days.

(21) Appl. No.: 17/725,138

(22) Filed: Apr. 20, 2022

(65) Prior Publication Data

US 2023/0344874 A1    Oct. 26, 2023

(51) Int. Cl.
*H04L 9/40* (2022.01)
*G06F 21/55* (2013.01)
*G06F 21/88* (2013.01)

(52) U.S. Cl.
CPC ............ *H04L 63/205* (2013.01); *G06F 21/55* (2013.01); *G06F 21/554* (2013.01); *G06F 21/88* (2013.01); *G06F 2221/2137* (2013.01); *G06F 2221/2143* (2013.01)

(58) Field of Classification Search
None
See application file for complete search history.

(56) References Cited

U.S. PATENT DOCUMENTS

| | | | |
|---|---|---|---|
| 7,571,468 B1 * | 8/2009 | Williams | G06F 21/34 |
| | | | 713/184 |
| 8,316,237 B1 | 11/2012 | Felsher et al. | |
| 8,370,362 B2 | 2/2013 | Szabo | |
| 8,428,227 B2 | 4/2013 | Angel et al. | |
| 8,832,827 B2 * | 9/2014 | Herscovitz | G06F 11/0757 |
| | | | 726/22 |
| 9,021,535 B2 | 4/2015 | Britt | |
| 9,311,499 B2 | 4/2016 | Redlich et al. | |
| 9,544,306 B2 * | 1/2017 | Brannon | G06F 21/45 |
| 9,734,169 B2 | 8/2017 | Redlich et al. | |
| 9,794,797 B2 | 10/2017 | Hoffberg | |
| 9,832,226 B2 | 11/2017 | Epstein | |
| 10,013,566 B2 | 7/2018 | Meyer et al. | |
| 10,015,720 B2 | 7/2018 | Perdomo | |

(Continued)

*Primary Examiner* — Boris D Grijalva Lobos
(74) *Attorney, Agent, or Firm* — Moore & Van Allen PLLC; Nicholas C. Russell (57) ABSTRACT

A system is provided for securing electronic devices and electronic data using automated dynamic control modifications. In particular, the system may comprise one or more electronic devices or computing devices, each of which may have a protection module installed thereon, where the security module may be configured by the system. The security module may define a time period within which the computing device must establish an authenticated connection to an authorized and/or trusted network. If the time period elapses without an authenticated connection and/or upon the occurrence of certain predetermined conditions, the security module may perform a secure wipe of the data on the computing device. In this way, the system may provide a way to secure electronic devices and data within the network environment.

20 Claims, 2 Drawing Sheets

(56) References Cited

U.S. PATENT DOCUMENTS

| | | |
|---|---|---|
| 10,101,716 B2 | 10/2018 | Kim |
| 10,218,741 B2 | 2/2019 | Gopalakrishna |
| 10,230,745 B2 | 3/2019 | Singh et al. |
| 10,250,619 B1 | 4/2019 | Park et al. |
| 10,637,724 B2 | 4/2020 | Johnson et al. |
| 10,764,254 B2 | 9/2020 | Ford et al. |
| 10,872,333 B2 | 12/2020 | Dua |
| 11,057,237 B2 | 7/2021 | Ansari et al. |
| 11,238,173 B2 | 2/2022 | Iyer et al. |
| 2006/0218633 A1* | 9/2006 | Suzuki .................... G06F 21/78 726/20 |
| 2007/0220511 A1* | 9/2007 | Clarke ...................... G06F 8/71 717/174 |
| 2007/0298767 A1* | 12/2007 | Brown .................... G06F 21/88 455/411 |
| 2009/0169017 A1* | 7/2009 | Smith ..................... G06F 21/57 380/278 |
| 2010/0318801 A1* | 12/2010 | Roberge ............. H04L 63/0853 713/172 |
| 2016/0164748 A1 | 6/2016 | Kim |
| 2017/0295147 A1* | 10/2017 | Manfe .................... G06F 21/44 |
| 2017/0357522 A1* | 12/2017 | Bower, III ............ G06F 9/4401 |
| 2019/0220260 A1* | 7/2019 | Gutman ............. G06F 11/1433 |
| 2021/0344651 A1* | 11/2021 | Joshi ................... H04L 12/4641 |
| 2022/0138336 A1* | 5/2022 | Luciani, Jr. ............. G06F 21/64 726/1 |
| 2022/0284125 A1* | 9/2022 | Sloane .................... G06F 21/31 |
| 2023/0300142 A1* | 9/2023 | Lang .................... H04L 63/083 726/4 |

* cited by examiner

FIG. 1

```
┌─────────────────────────────────────────────────────────────┐
│ DETECT, USING A SECURITY MODULE, ONE OR MORE SECURITY       │
│ CONDITIONS ASSOCIATED WITH AN ENDPOINT DEVICE               │
│                           201                                │
└─────────────────────────────────────────────────────────────┘
                              │
                              ▼
┌─────────────────────────────────────────────────────────────┐
│ GENERATE, USING A DECISIONING ENGINE, ONE OR MORE           │
│ PARAMETERS TO INTELLIGENTLY MODIFY A CONFIGURATION OF THE   │
│ SECURITY MODULE BASED ON DETECTING THE ONE OR MORE          │
│ SECURITY CONDITIONS                                          │
│                           202                                │
└─────────────────────────────────────────────────────────────┘
                              │
                              ▼
┌─────────────────────────────────────────────────────────────┐
│ INITIALIZE A COUNTDOWN USING THE SECURITY MODULE, WHEREIN A │
│ DURATION OF THE COUNTDOWN IS CONFIGURED BASED ON THE ONE OR │
│ MORE PARAMETERS                                              │
│                           203                                │
└─────────────────────────────────────────────────────────────┘
                              │
                              ▼
┌─────────────────────────────────────────────────────────────┐
│ DETECT THAT THE DURATION OF THE COUNTDOWN HAS ELAPSED        │
│                           204                                │
└─────────────────────────────────────────────────────────────┘
                              │
                              ▼
┌─────────────────────────────────────────────────────────────┐
│ BASED ON DETECTING THAT THE DURATION OF THE COUNTDOWN HAS   │
│ ELAPSED, EXECUTE ONE OR MORE REMEDIATION PROCESSES ON THE   │
│ ENDPOINT DEVICE USING THE SECURITY MODULE                    │
│                           205                                │
└─────────────────────────────────────────────────────────────┘
```

FIG. 2

SYSTEM FOR SECURING ELECTRONIC DEVICES AND ELECTRONIC DATA USING AUTOMATED DYNAMIC CONTROL MODIFICATIONS

FIELD OF THE INVENTION

The present disclosure embraces a system for securing electronic devices and electronic data using automated dynamic control modifications.

BACKGROUND

There is a need for an effective way to secure electronic devices and data.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for securing electronic devices and electronic data using automated dynamic control modifications. In particular, the system may comprise one or more electronic devices or computing devices, each of which may have a protection module installed thereon, where the security module may be configured by the system. The security module may define a time period within which the computing device must establish an authenticated connection to an authorized and/or trusted network. If the time period elapses without an authenticated connection and/or upon the occurrence of certain predetermined conditions, the security module may perform a secure wipe of the data on the computing device. In this way, the system may provide a way to secure electronic devices and data within the network environment.

Accordingly, embodiments of the present disclosure provide a system for securing electronic devices and electronic data using automated dynamic control modifications, the system comprising a memory device with computer-readable program code stored thereon; a communication device; and a processing device operatively coupled to the memory device and the communication device, wherein the processing device is configured to execute the computer-readable program code to detect, using a security module, one or more security conditions associated with an endpoint device; generate, using a decisioning engine, one or more parameters to intelligently modify a configuration of the security module based on detecting the one or more security conditions; initialize a countdown using the security module, wherein a duration of the countdown is configured based on the one or more parameters; detect that the duration of the countdown has elapsed; and based on detecting that the duration of the countdown has elapsed, execute one or more remediation processes on the endpoint device using the security module.

In some embodiments, the processing device is further configured to execute the computer-readable program code to detect that the endpoint device has been authenticated and has connected to a trusted network; and reset the duration of the countdown.

In some embodiments, the security module is installed on the endpoint device with root level access to the security device.

In some embodiments, the security module is configured to inject executable code into a memory of the endpoint device before booting of an operating system on the endpoint device.

In some embodiments, the one or more remediation processes comprises automatically performing a secure wipe of the endpoint device and restoring standard settings for the endpoint device using a backup image stored within the security module.

In some embodiments, one or more parameters comprises at least one of a designated authorized geographic area for the endpoint device, a number of failed authentication attempts on the endpoint device, and a type of data stored within the endpoint device.

In some embodiments, the one or more security conditions comprises at least one of the endpoint device being located outside of an authorized geographic area, the endpoint device being accessed by an unauthorized user, or sensitive data within the endpoint device being accessed.

Embodiments of the present disclosure also provide a computer program product for securing electronic devices and electronic data using automated dynamic control modifications, the computer program product comprising at least one non-transitory computer readable medium having computer-readable program code portions embodied therein, the computer-readable program code portions comprising executable portions for detecting, using a security module, one or more security conditions associated with an endpoint device; generating, using a decisioning engine, one or more parameters to intelligently modify a configuration of the security module based on detecting the one or more security conditions; initializing a countdown using the security module, wherein a duration of the countdown is configured based on the one or more parameters; detecting that the duration of the countdown has elapsed; and based on detecting that the duration of the countdown has elapsed, executing one or more remediation processes on the endpoint device using the security module.

In some embodiments, the computer-readable program code portions further comprise executable portions for detecting that the endpoint device has been authenticated and has connected to a trusted network; and resetting the duration of the countdown.

In some embodiments, the security module is installed on the endpoint device with root level access to the security device.

In some embodiments, the security module is configured to inject executable code into a memory of the endpoint device before booting of an operating system on the endpoint device.

In some embodiments, the one or more remediation processes comprises automatically performing a secure wipe of the endpoint device and restoring standard settings for the endpoint device using a backup image stored within the security module.

In some embodiments, one or more parameters comprises at least one of a designated authorized geographic area for the endpoint device, a number of failed authentication attempts on the endpoint device, and a type of data stored within the endpoint device.

Embodiments of the present disclosure also provide a computer-implemented method for securing electronic devices and electronic data using automated dynamic control modifications, the computer-implemented method comprising detecting, using a security module, one or more security conditions associated with an endpoint device; generating, using a decisioning engine, one or more parameters to intelligently modify a configuration of the security module based on detecting the one or more security conditions; initializing a countdown using the security module, wherein a duration of the countdown is configured based on the one or more parameters; detecting that the duration of the countdown has elapsed; and based on detecting that the duration of the countdown has elapsed, executing one or more remediation processes on the endpoint device using the security module.

In some embodiments, the computer-implemented method further comprises detecting that the endpoint device has been authenticated and has connected to a trusted network; and resetting the duration of the countdown.

In some embodiments, the security module is installed on the endpoint device with root level access to the security device.

In some embodiments, the security module is configured to inject executable code into a memory of the endpoint device before booting of an operating system on the endpoint device.

In some embodiments, the one or more remediation processes comprises automatically performing a secure wipe of the endpoint device and restoring standard settings for the endpoint device using a backup image stored within the security module.

In some embodiments, one or more parameters comprises at least one of a designated authorized geographic area for the endpoint device, a number of failed authentication attempts on the endpoint device, and a type of data stored within the endpoint device.

In some embodiments, the one or more security conditions comprises at least one of the endpoint device being located outside of an authorized geographic area, the endpoint device being accessed by an unauthorized user, or sensitive data within the endpoint device being accessed.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization such as a financial institution, a non-profit organization, a government organization, and the like, which may routinely use various types of applications within its enterprise environment to accomplish its organizational objectives.

"The system" or "entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, "user" as used herein may refer to a computerized resource (e.g., a computing system, application, system process, or the like) that may access other resources as part of its operations.

Accordingly, as used herein the term "user device" or "mobile device" may refer to mobile phones, personal computing devices, tablet computers, wearable devices, and/or any portable electronic device capable of receiving and/or storing data therein.

"Resource" as used herein may refer to tangible or intangible objects which may be held, owned, or used by a user and/or the entity. In particular, "resource" as used herein may refer to computing resources such as hardware (e.g., computing systems, hardware components, servers, wireless smart devices, IoT devices, or the like) and/or software (e.g., applications, operating systems, data repositories, or the like).

"Endpoint device" as used herein generally refers to a computing device or electronic device that is connected to a network (e.g., the entity's network).

"Security module" as used herein may refer to a set of executable code that may be installed onto an endpoint device and grants root-level access to the endpoint device. Accordingly, the security module may have access to functions or processes of the endpoint device that may require elevated privileges. In some embodiments, the security module may be configured to obfuscate its existence to users and/or the computing device itself.

An entity's network environment may include a number of computing devices connected to the network, where the endpoint devices may store sensitive data. Accordingly, the entity may wish to secure the endpoint devices and the electronic data stored thereon to prevent access by unauthorized users and/or unauthorized uses of the endpoint devices and/or the electronic data. To address these concerns among others, the system described herein may install a security module on each of the endpoint devices connected to the network. The security module may be installed at a root level of access on the endpoint device such that the security module may be authorized to execute any type of process on the computing device, including those processes that may require elevated privileges.

The security module may comprise an image (e.g., a disk image) containing the data contents of an endpoint device configured with the standard or "factory" settings (e.g., an operating system, critical applications, security updates, and the like). In some embodiments, the disk image may be configured to be read-only such that the contents may not be modified by the computing device on which the disk image is stored.

The security module may configure, for the endpoint device, a countdown of a duration set by the security module (e.g., 60 seconds, 6 hours, 1 day, or the like). Once configured, the security module may initiate the countdown (e.g., upon the occurrence of certain conditions), during which the endpoint device must connected to an authorized and/or trusted network or device. If the endpoint device connects to the authorized network or device, the duration may be reset by the security module to its initial value. If, however, the endpoint device fails to connect to an authorized network or device before the duration of the countdown elapses, the system may automatically initiate one or more remediation processes to secure the endpoint device and the data stored therein. In some embodiments, the duration of the countdown may be set to low values (e.g., 0 seconds) depending on the parameters defined within the security module. For instance, if the user locally accesses certain sensitive files within the endpoint device without authorization, the security module may automatically initiate remediation processes to protect the sensitive files.

In some embodiments, the duration may be configurable based on one or more parameters, such as changes in the geographic location of the endpoint device, the number of local authentication attempts on the endpoint device, the access of locally stored files on the endpoint device by the user, failed authentication attempts u sing the endpoint device, and the like.

In some embodiments, the system may generate, via a hash algorithm, a hash output value based on the configuration of the security modules and/or the endpoint devices (or a "configuration hash"). Accordingly, inputs for the configuration hashes may include security module parameters, data access permissions, key operating system files, core applications, and the like. Configuration hashes of trusted configurations of endpoint devices may be referred to as "trusted configuration hashes." The trusted configuration hashes may be stored in a configuration hash database, which may store the trusted configuration hashes for each type of endpoint device within the network. Subsequently, the system may periodically access the endpoint devices to compute a configuration hash of the endpoint device in its current state (e.g., a "current configuration hash") and compare the current configuration hash with the trusted configuration hash stored within the configuration hash database. If the current configuration hash does not match the trusted configuration hash, the system may automatically execute one or more remediation processes based on the mismatch.

The system may comprise a decisioning engine that may generate the inputs used to set the parameters and/or configurations of the security modules and/or the endpoint devices. In this regard, the decisioning engine may generate the inputs based on one or more variables, which may include the nature of the data stored within the endpoint device (e.g., how sensitive or confidential the data is, what users are authorized to access the data, and the like), the likelihood of compromise or unauthorized possession of the endpoint device, threat vectors affecting the endpoint device, historical data regarding loss events associated with the endpoint device or similar endpoint devices, and the like.

Accordingly, the inputs generated by the decisioning engine (and thus the parameters or configurations of the security module) may in turn affect the types of remediation processes that may be executed by the security module based on varying scenarios. For instance, in order to protect highly sensitive data, the security module may, upon detecting the occurrence of the predefined conditions (e.g., the duration of the countdown has elapsed, the endpoint device has been moved to an unauthorized location, the local files have been accessed by an unauthorized user, or the like), perform an automated and secure wipe of the endpoint device and fully restore the standard settings of the endpoint device based on the disk image stored therein. On the other hand, in instances in which the data to be protected is less sensitive, the endpoint device may execute remediation processes such as performing a partial wipe and restoration of the endpoint device, locking or revoking authentication credentials, displaying warning messages or alerts on the endpoint device, performing encryption of the endpoint device to lock out unauthorized users, or the like.

In some embodiments, the system may further comprise a reporting engine configured to display, to the user, a graphical interface of a dashboard. The dashboard may be presented on a display device of a user computing system, where the dashboard may include information such as the status of endpoint devices (e.g., offline or online status of the endpoint device, status of the security module, the status of the countdown timer, location of the endpoint device, existence of certain conditions relevant to the security module and/or the endpoint device, and the like), "last seen" dates of the endpoint device, data classification of the data stored within the endpoint devices, historical trends with respect to endpoint devices and/or data, possibilities of device or data compromise, security posture, and the like.

A number of exemplary use cases are provided below. It should be understood that the following use cases are described for illustrative purposes only and are not intended to restrict the scope of the disclosure herein. In one embodiment, the endpoint device may be a desktop computing system maintained in a secured area within the entity's premises, where a selected group of users are authorized to access the endpoint device. The endpoint device may store highly sensitive data (e.g., customer PII). In such an embodiment, the decisioning engine may configure the security module to set a relatively short duration for the countdown (e.g., 10 seconds) based on the sensitive nature of the endpoint device and the data stored therein. If the duration elapses without the endpoint device connecting to a trusted computing system or network, the security module may perform a full wipe of the endpoint device and restore the endpoint device to its standard settings using the disk image stored therein. In some embodiments, the security module may automatically perform the wipe and restore process on the endpoint device based on the occurrence of other conditions (e.g., the endpoint device is removed from the entity's secured area, the number of failed authentication attempts exceeds a certain threshold, an unauthorized user attempts to access the sensitive data, or the like).

In another embodiment, the endpoint device may be a portable computing system such as a laptop computer, which is designed to be transported from one location to another. The endpoint device may be a device that has been provisioned to a user within the entity's network (e.g., an agent or employee of the entity) and store data that is of a less sensitive nature than the endpoint device in the first use case described above. In such an embodiment, the decisioning engine may configure the security module to set a countdown duration that is relatively longer (e.g., 24 hours) based on the less sensitive nature of the endpoint device and the data stored therein. Furthermore, if the duration of the countdown elapses, the system may, rather than performing a wipe of the device, suspend the authentication credentials of the users associated with the endpoint device until the endpoint device connects to a trusted network. In this way, the system may select the remediation process that is most appropriate for the type of endpoint device and/or the data stored therein.

The system as described herein confers a number of technological advantages over conventional data security systems. For instance, installing the security module at the root level on the endpoint devices ensures that endpoint devices will continue to be secured and protected even if there is a change in the configuration or policies of the endpoint devices. Furthermore, the decisioning engine allows the security modules to be configured to best suit the endpoint device on which the security module is installed and the data stored on the endpoint device.

Figure 1:
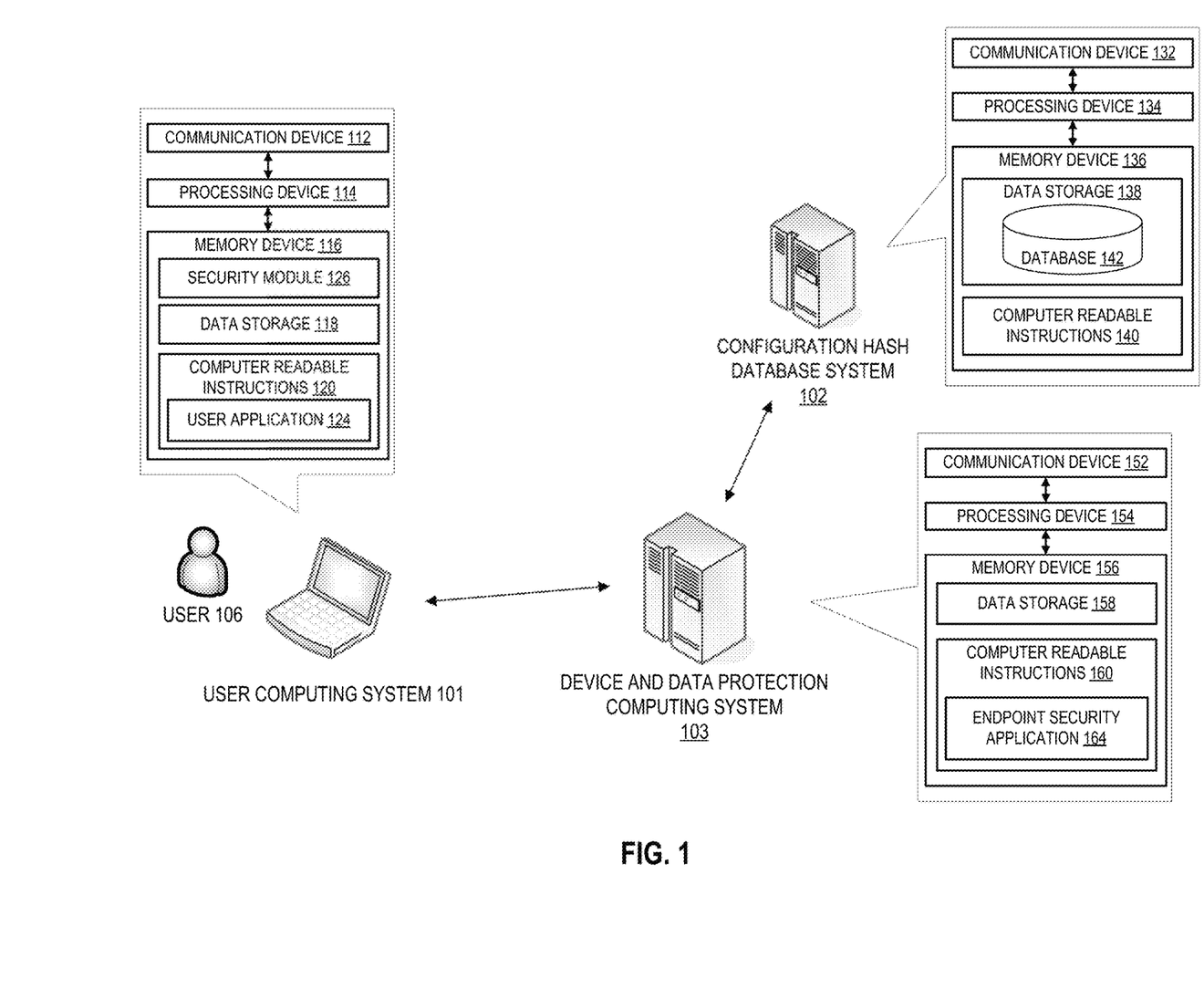
FIG. 1 illustrates an operating environment for the secure electronic device control system, in accordance with one embodiment of the present disclosure.

Turning now to the figures, FIG. 1 illustrates an operating environment 100 for the secure electronic device control system, in accordance with one embodiment of the present disclosure. In particular, FIG. 1 illustrates a device and data protection computing system 103 in operative communication with a user computing system 101 and configuration hash database system 102 over a network. In such a configuration, the device and data protection computing system 103 may transmit data to and receive data from computing systems over the network, including the user computing system 101 and/or the configuration hash database system 102.

It should be understood that FIG. 1 illustrates only an exemplary embodiment of the operating environment 100, and it will be appreciated that the operating environment 100 may comprise fewer or greater numbers of computing systems than what is depicted in FIG. 1. For example, though FIG. 1 depicts a single configuration hash database system 102, the operating environment may comprise multiple networked databases that may be used to store data regarding the configuration of endpoint devices. It should also be appreciated that one or more functions of the systems, devices, or servers as depicted in FIG. 1 may be combined into a single system, device, or server and/or performed by other computing systems. For instance, though the device and data protection computing system 103 and the configuration hash database system 102 are depicted as separate systems, the functions of both systems may in some embodiments be combined into a single computing system. Furthermore, the functions of a single system, device, or server as depicted in FIG. 1 may be distributed across multiple computing systems.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), Wi-Fi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the device and data protection computing system 103 may be a computing system that manages the security of endpoint devices within the network. Accordingly, the device and data protection computing system 103 may comprise a processing device 154 operatively coupled to a communication device 152 and a memory device 156. The memory device 156 may comprise data storage 158 and computer readable instructions 160 stored thereon, where the computer readable instructions 160 may comprise an endpoint security application 164. The endpoint security application 164 may, when executed by the processor 154 of the device and data protection computing system 103, cause the processor 154 to perform certain functions of the system, including authentication of endpoint devices, intelligent modification of security modules, presentation of the user dashboard, analytical decisioning, and other functions as described elsewhere herein.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The communication device 152, and other communication devices as described herein, may comprise a wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the systems described herein may also include a communication interface device that may be connected by a hardwire connection to the resource distribution device. The interface device may comprise a connector such as a USB, SATA, PATA, SAS or other data connector for transmitting data to and from the respective computing system.

As further illustrated in FIG. 1, the user computing system 101 may be in operative communication with the configuration hash database system 102 and/or the device and data protection computing system 103. The user computing system 101 may be a computing system operated by a user 106, where the user may be an individual who is associated with the entity (e.g., an authorized user on the entity's network such as an agent, employee, or customer of the entity). Accordingly, the user computing system 101 may be an endpoint device, though it is within the scope of the endpoint device to be a computing system that is not regularly used by a user (e.g., the user 106).

The user 106 may, using the user computing system 101, receive and/or transmit various types of network communications with the various computing systems in the network environment. Accordingly, the user computing system 101 may comprise a communication device 112, a processing device 114, and a memory device 116. In some embodiments, the user computing system 101 may comprise hardware and/or software components that allow the user computing system 101 to interface with the user 106. In such embodiments, the user computing system 101 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

The memory device 116 of the user computing system 101 may further comprise data storage 118 and computer-readable instructions 120 stored thereon. In some embodiments (e.g., embodiments in which the user computing system 101 is an endpoint device), the memory device 116 may further comprise a security module 126. The security module 126 may have root level access to the functions of the user computing system 101. In this regard, the security module 126 may be installed at the application level, kernel level, and/or firmware level of the user computing system 101.

The computer-readable instructions 120 of the user computing system 101 may comprise a user application 124. The user application 124 may be a software application that the user 106 may use to access and view the dashboard hosted on the device and data protection computing system 103. Accordingly, in some embodiments, the user application 124 may be an application provided by the entity. In other embodiments, the user application 124 may be a third party application such as a web browser. In such embodiments, the event dashboard may be implemented as a web-based application or site hosted by the device and data protection computing system 103.

As further illustrated in FIG. 1, the configuration hash database system 102 may be a computing system that stores the configuration hash values associated with the various endpoint devices within the network. Accordingly, the configuration hash database system 102 may comprise a communication device 132, a processing device 134, and a memory device 136, where the processing device 134 is operatively coupled to the communication device 132 and the memory device 136. The processing device 134 uses the communication device 132 to communicate with the network and other devices on the network. As such, the communication device 132 generally comprises a modem, antennae, Wi-Fi or Ethernet adapter, radio transceiver, or other device for communicating with other devices on the network.

The memory device 136 comprises computer-readable instructions 140 and data storage 138. The data storage 138 of the configuration hash database system 102 may comprise a database 142, where the database 142 is a configuration hash database comprising hash values of the configurations of the endpoint devices in the network. In this regard, each configuration hash may be stored and associated with an identifier of an endpoint device (e.g., a unique serial number or name). In some embodiments, the database 142 may further store additional information about each endpoint device, such as last known location, last date seen on the network, authorized users associated with the endpoint device, known instances of compromise, and the like.

The communication devices as described herein may comprise a wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the distributed register node 103 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic, or other systems that perform various functions of the computing systems. These systems may comprise, for example, electrical circuits, motors, compressors, or any system that enables functioning of the computing systems.

Figure 2:
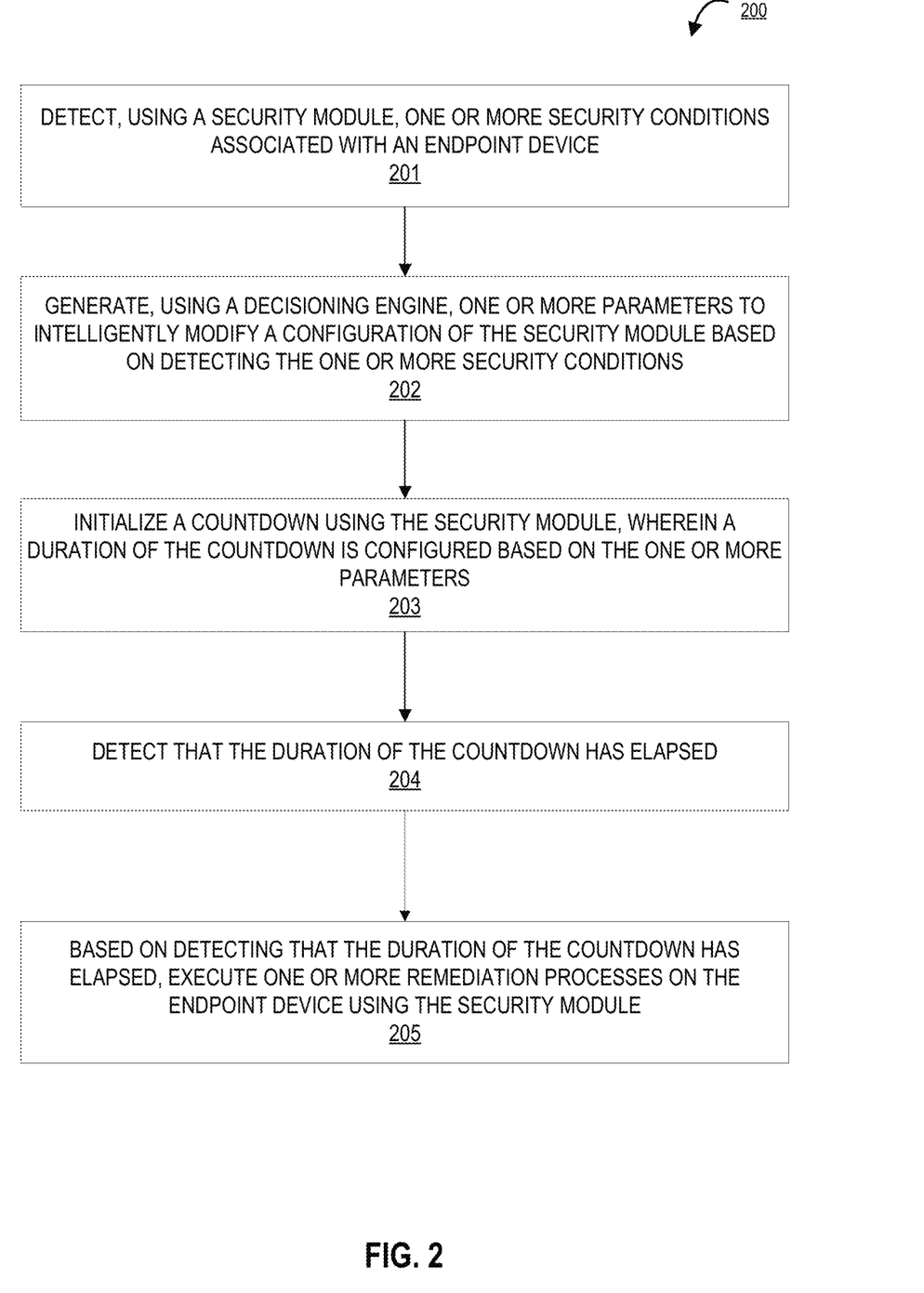
FIG. 2 is a flow diagram illustrating a process for securing electronic devices and electronic data using automated dynamic control modifications, in accordance with one embodiment of the present disclosure.

FIG. 2 is a flow diagram illustrating a process flow 200 for securing electronic devices and electronic data using automated dynamic control modifications. The process begins at block 201, where the system detects, using a security module, one or more security conditions associated with an endpoint device. The security module may be a software-based module that contains executable code and is installed with root level access to the endpoint device. In this regard, the security module may be installed at an application level, kernel level, and/or a firmware level of the endpoint device. The security module may be configured to execute certain security-oriented processes to protect the security of the endpoint device and/or the data stored within the endpoint device. Accordingly, the security module may detect the existence of certain security conditions that may affect the security of the endpoint device. For instance, the security conditions may include possession of the endpoint device by a user outside of authorized boundaries, misuse of sensitive data stored in the endpoint device, attempts to access protected data within the endpoint device, and the like. In some embodiments, the security module may be configured to obfuscate its existence and/or prevent the modification or removal of the security module. For instance, the security module may inject its executable code into the memory prior to the booting of the operating system of the endpoint device.

The process continues to block 202, where the system generates, using a decisioning engine, one or more parameters to intelligently modify a configuration of the security module based on detecting the one or more security conditions. The parameters may determine the settings of the security module that may affect the types of remediation processes executed by the security module in response to the security conditions. For instance, the parameters may include geographic limits within which the endpoint device must be located, a number of allowed failed authentication attempts, local file permissions, the types or classifications of data stored within the endpoint device (e.g., the level of sensitivity or confidentiality of the data), and the like. The parameters may in turn be modified intelligently by a decisioning engine that may assess a security posture of the endpoint device based on the type of device (e.g., a portable vs. a stationary device), the number or types of users authorized to access the device, the operating system and/or presence of critical security updates, threat intelligence feed data (e.g., information about vectors that may affect the endpoint device), and the like.

The process continues to block 203, where the system initializes a countdown using the security module, wherein a duration of the countdown is configured based on the one or more parameters. In particular, the security posture of a particular endpoint device may affect whether the duration of the countdown is shorter or longer. For instance, stricter parameters may be set for an endpoint device that contains particularly sensitive data or is intended to be used in a highly specific geographic area (e.g., a particular room within an entity's premises). As such, stricter parameters may result in a shorter duration for the countdown, thereby resulting in a more expedient execution of remediation processes. On the other hand, less strict parameters may be set for an endpoint device that stores less sensitive data or is expected to be used in various geographic locations (e.g., a portable device such as a smartphone), thereby lengthening the duration of the countdown.

The process continues to block 204, where the system detects that the duration of the countdown has elapsed. In some embodiments, the duration of the countdown may be reset by the system upon detecting that the endpoint device has securely been authenticated and has connected to a trusted network. If the duration elapses without the endpoint device connecting to the trusted network, the system may consider the endpoint device to have deviated from the parameters set by the decisioning engine. In other words, the security posture of the endpoint device is considered to have shifted outside of acceptable thresholds. Accordingly, the system may execute various remediation processes to remedy the security of the endpoint device.

The process concludes at block 205, where the system, based on detecting that the duration of the countdown has elapsed, executes one or more remediation processes on the endpoint device using the security module. The one or more remediation processes may include full or partial wipes of the endpoint devices, restoration of standard settings for the endpoint devices using a backup image, forced encryption of the data on the endpoint device, network segmentation, modification or revocation of authentication credentials, and the like. In some embodiments, the remediation processes may be selected based on the parameters associated with the endpoint device. For instance, endpoint devices containing particularly sensitive data may be fully and securely wiped automatically once the duration of the countdown has elapsed, whereas less sensitive endpoint devices may be partially wiped or locked until the endpoint device is accessed by an authorized user (e.g., an administrator). In this way, the system is able to intelligently scale the remediation processes based on the security posture of the endpoint device.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for securing electronic devices and electronic data using automated dynamic control modifications, the system comprising:
   a memory device with computer-readable program code stored thereon;
   a communication device; and
   a processing device operatively coupled to the memory device and the communication device, wherein the processing device is configured to execute the computer-readable program code to:
   detect, using a security module, one or more security conditions associated with an endpoint device;
   generate, using a decisioning engine, one or more parameters to modify a configuration of the security module based on detecting the one or more security conditions, wherein generating the one or more parameters comprises determining a sensitivity of data stored on the endpoint device;
   initialize a countdown using the security module, wherein a duration of the countdown is configured based on the sensitivity of the data stored on the endpoint device;
   detect that the duration of the countdown has elapsed;
   generate a current configuration hash based on the configuration of the endpoint device;
   compare the current configuration hash with a trusted configuration hash associated with the endpoint device; and
   based on detecting that the duration of the countdown has elapsed or that the current configuration hash does not match the trusted configuration hash, execute one or more remediation processes on the endpoint device using the security module.

2. The system according to claim 1, wherein the processing device is further configured to execute the computer-readable program code to:
   detect that the endpoint device has been authenticated and has connected to a trusted network; and
   reset the duration of the countdown.

3. The system according to claim 1, wherein the security module is installed on the endpoint device with root level access to the endpoint device.

4. The system according to claim 3, wherein the security module is configured to inject executable code into a memory of the endpoint device before booting of an operating system on the endpoint device.

5. The system according to claim 1, wherein the one or more remediation processes comprises automatically performing a secure wipe of the endpoint device and restoring standard settings for the endpoint device using a backup image stored within the security module.

6. The system according to claim 1, wherein one or more parameters comprises at least one of a designated authorized geographic area for the endpoint device, a number of failed authentication attempts on the endpoint device, and a type of data stored within the endpoint device.

7. The system according to claim 1, wherein the one or more security conditions comprises at least one of the endpoint device being located outside of an authorized geographic area, the endpoint device being accessed by an unauthorized user, or sensitive data within the endpoint device being accessed.

8. A computer program product for securing electronic devices and electronic data using automated dynamic control modifications, the computer program product comprising at least one non-transitory computer readable medium having computer-readable program code portions embodied therein, the computer-readable program code portions comprising executable portions for:
   detecting, using a security module, one or more security conditions associated with an endpoint device;
   generating, using a decisioning engine, one or more parameters to modify a configuration of the security module based on detecting the one or more security conditions, wherein generating the one or more parameters comprises determining a sensitivity of data stored on the endpoint device;
   initializing a countdown using the security module, wherein a duration of the countdown is configured based on the sensitivity of the data stored on the endpoint device;
   detecting that the duration of the countdown has elapsed;
   generating a current configuration hash based on the configuration of the endpoint device;

comparing the current configuration hash with a trusted configuration hash associated with the endpoint device; and based on detecting that the duration of the countdown has elapsed or that the current configuration hash does not match the trusted configuration hash, executing one or more remediation processes on the endpoint device using the security module.

9. The computer program product of claim 8, wherein the computer-readable program code portions further comprise executable portions for:

detecting that the endpoint device has been authenticated and has connected to a trusted network; and resetting the duration of the countdown.

10. The computer program product of claim 8, wherein the security module is installed on the endpoint device with root level access to the endpoint device.

11. The computer program product of claim 10, wherein the security module is configured to inject executable code into a memory of the endpoint device before booting of an operating system on the endpoint device.

12. The computer program product of claim 8, wherein the one or more remediation processes comprises automatically performing a secure wipe of the endpoint device and restoring standard settings for the endpoint device using a backup image stored within the security module.

13. The computer program product of claim 8, wherein one or more parameters comprises at least one of a designated authorized geographic area for the endpoint device, a number of failed authentication attempts on the endpoint device, and a type of data stored within the endpoint device.

14. A computer-implemented method for securing electronic devices and electronic data using automated dynamic control modifications, the computer-implemented method comprising:

detecting, using a security module, one or more security conditions associated with an endpoint device;

generating, using a decisioning engine, one or more parameters to modify a configuration of the security module based on detecting the one or more security conditions, wherein generating the one or more parameters comprises determining a sensitivity of data stored on the endpoint device;

initializing a countdown using the security module, wherein a duration of the countdown is configured based on the sensitivity of the data stored on the endpoint device;

detecting that the duration of the countdown has elapsed;

generating a current configuration hash based on the configuration of the endpoint device;

comparing the current configuration hash with a trusted configuration hash associated with the endpoint device; and based on detecting that the duration of the countdown has elapsed or that the current configuration hash does not match the trusted configuration hash, executing one or more remediation processes on the endpoint device using the security module.

15. The computer-implemented method of claim 14, wherein the computer-implemented method further comprises:

detecting that the endpoint device has been authenticated and has connected to a trusted network; and resetting the duration of the countdown.

16. The computer-implemented method of claim 14, wherein the security module is installed on the endpoint device with root level access to the endpoint device.

17. The computer-implemented method of claim 16, wherein the security module is configured to inject executable code into a memory of the endpoint device before booting of an operating system on the endpoint device.

18. The computer-implemented method of claim 14, wherein the one or more remediation processes comprises automatically performing a secure wipe of the endpoint device and restoring standard settings for the endpoint device using a backup image stored within the security module.

19. The computer-implemented method of claim 14, wherein one or more parameters comprises at least one of a designated authorized geographic area for the endpoint device, a number of failed authentication attempts on the endpoint device, and a type of data stored within the endpoint device.

20. The computer-implemented method of claim 14, wherein the one or more security conditions comprises at least one of the endpoint device being located outside of an authorized geographic area, the endpoint device being accessed by an unauthorized user, or sensitive data within the endpoint device being accessed.

\* \* \* \* \*